United States Patent [19]
Hing et al.

[11] Patent Number: 4,513,178
[45] Date of Patent: Apr. 23, 1985

[54] SIGNAL PROCESSING ARRANGEMENT
[75] Inventors: Sam A. Hing, Gland, Switzerland; Michel Guillien, Gex, France
[73] Assignee: Motorola, Inc., Schaumburg, Ill.
[21] Appl. No.: 485,819
[22] Filed: Apr. 18, 1983
[30] Foreign Application Priority Data
Apr. 21, 1982 [FR] France ................................ 82 06865
[51] Int. Cl.³ .......................................... H04M 19/00
[52] U.S. Cl. ................... 179/81 R; 323/316; 179/16 F
[58] Field of Search ................. 179/81 R, 81 B, 16 F; 323/315, 316, 280, 281

[56] References Cited
U.S. PATENT DOCUMENTS
4,414,434 11/1983 Ferrieu et al. .................. 323/315 X Primary Examiner—Gene Z. Rubinson
Assistant Examiner—James L. Dwyer
Attorney, Agent, or Firm—Joe E. Barbee

[57] ABSTRACT

The invention relates to a signal processing arrangement which in a preferred form is part of a telephone speech circuit.

The circuit arrangement includes an operational amplifier for processing signals coupled to an input terminal via a capacitor. In order to control output current provided by the arrangement a current is coupled to the input terminal of the amplifier which is fed with the signals to be amplified and an equal and opposite current is fed to the opposite side of the capacitor so that the effects of any unwanted A.C. components in the control current may be reduced.

The use of the circuit allows a single capacitor to perform multiple functions thereby reducing the number of capacitors and the number of terminal pins of an integrated circuit package incorporating the circuit.

The invention is particularly suitable for use in a telephone speech circuit.

22 Claims, 1 Drawing Figure

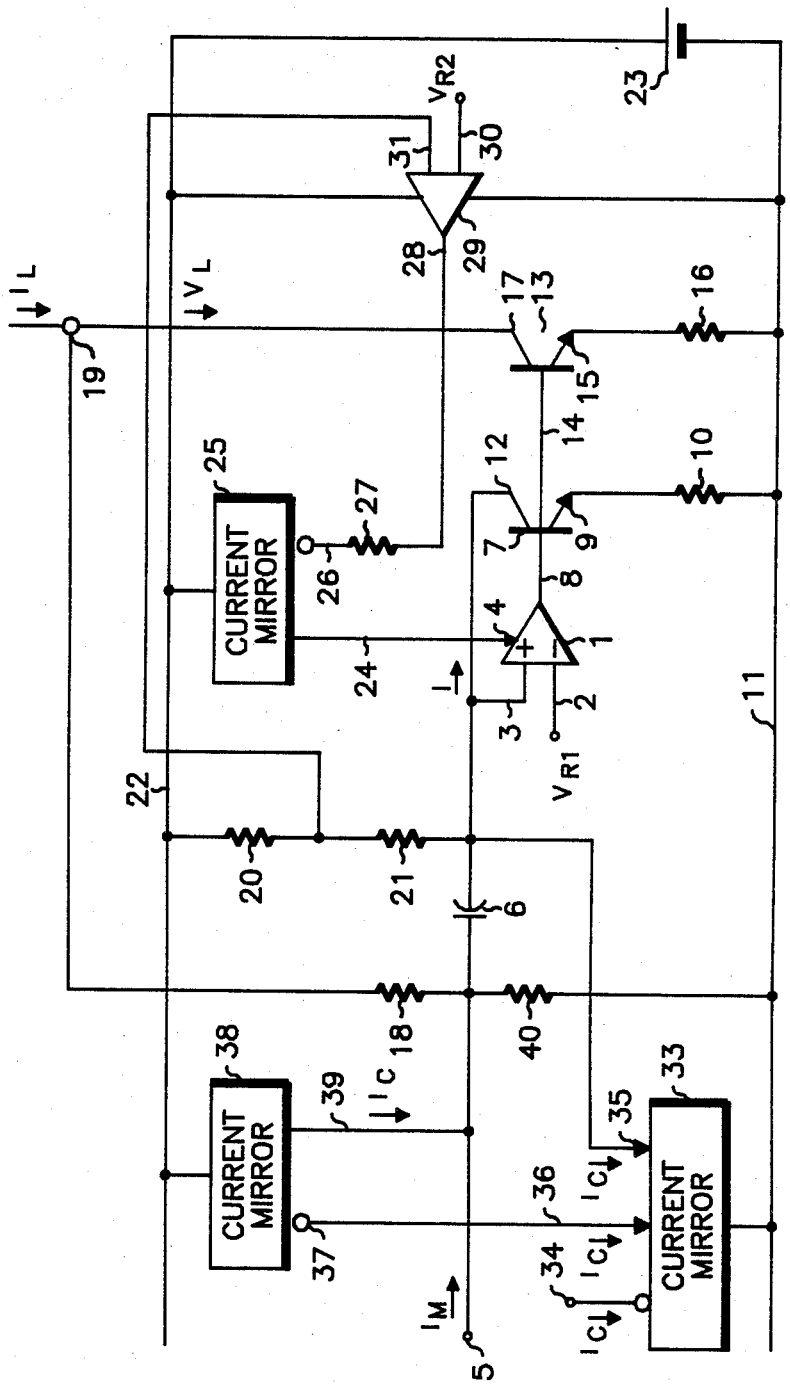

SIGNAL PROCESSING ARRANGEMENT

TECHNICAL FIELD

This invention relates to a signal processing arrangement and particularly although not exclusively, to an arrangement for use in a telephone speech circuit.

BACKGROUND ART

A signal processing arrangement in the form of a telephone speech circuit is connected to a subscriber line and performs several functions. In addition to processing speech signals fed from a subscribers telephone handset the speech circuit acts as a regulator.

For example, the subscribers line carries both a D.C. voltage and an A.C. speech signal and is connected to the speech circuit via a diode bridge. The diode bridge provides an A.C. speech signal superimposed on a D.C. level.

The subscribers line may be either relatively long, having a relatively high impedance or may be relatively short and have a comparatively low impedance. In the former case, there is relatively little D.C. current available and the speech circuit must draw maximum available current and have only a small voltage drop across itself. The speech circuit therefore acts as a voltage regulator so that the voltage across itself will remain almost constant and low.

When the line is shorter the current drawn from the line is limited by the speech circuit itself which acts as a current regulator.

In practice, the voltage supplied by the diode bridge is compared with a reference potential and a D.C. control signal is derived from this comparison and utilized to control the current drawn by the speech circuit.

The D.C. control signal will inevitably contain A.C. components which would upset the regulation functions and therefore these components should ideally be removed. A filter may be used in the output of the comparator but inevitably second order components of unwanted A.C. signals would be present and these preferably should be removed. Second order filtering therefore forms part of the speech circuit and involves the use of a capacitance.

Other functions of the circuit also involve the use of capacitances and these include A.C. coupling for speech signals and impedance matching of the circuit to the subscriber line.

It is desirable to produce the circuit as an integrated circuit and the use of a large number of capacitors to achieve the above functions is undesirable because this would increase the cost of the circuit. Further it is also desirable to keep the number of pins required on the integrated circuit package to a minimum and this requirement also makes it desirable to keep the numbers of capacitors required in the circuit to a minimum.

BRIEF DESCRIPTION OF THE INVENTION

This invention seeks to provide a signal processing arrangement suitable for fabrication as an integrated circuit and in which the number of capacitors is sought to be minimised.

According to the present invention there is provided a signal processing arrangement comprising an operational amplifier having a first input terminal for receiving a reference potential, a second input terminal and an output terminal, negative feedback means coupled between the output terminal of the amplifier and the second input terminal; a further input terminal for receiving signals to be processed; capacitive means coupled between the further input terminal and the second input terminal of the amplifier; means for coupling a predetermined current to the second input terminal of the amplifier and as an equal and opposite current to the further input terminal whereby an output current derived from the output terminal may be regulated and the effects of any unwanted A.C. components in the predetermined current reduced.

The means for coupling the predetermined current may comprise a current steering circuit arrangement and in a preferred embodiment comprises a current mirror circuit arrangement.

The negative feedback means may include current feedback means.

The current feedback means may comprise a transistor having a base electrode coupled to the output terminal of the amplifier, an emitter electrode coupled to a reference potential and a collector electrode coupled to the second input terminal of the amplifier.

The negative feedback means may include voltage feedback means.

The voltage feedback means may comprise a transistor having a base electrode coupled to the output terminal of the amplifier, an emitter electrode coupled to a reference potential and a collector electrode connected via resistive means to the further input terminal.

The operational amplifier may be a programmable operational amplifier which may be turned "ON" in response to a programming current fed to a programming input of the amplifier.

The programming current may be derived from the output of a comparator arranged to compare a potential representative of the state of charge of the said capacitive means with a reference potential.

The signal processing arrangement may in a preferred embodiment form part of a telephone speech circuit.

The signal processing arrangement is advantageously fabricated as an integrated circuit.

BRIEF DESCRIPTION OF DRAWINGS

An exemplary embodiment of the present invention will now be described with reference to the accompanying single FIGURE drawing which shows in highly schematic form a signal processing arrangement in accordance with the present invention.

DETAILED DESCRIPTION OF THE INVENTION

Referring to the drawing, there is shown a signal processing arrangement forming part of a telephone speech circuit. The speech circuit includes an operational amplifier 1 having a first and negative input terminal 2 to which in operation a reference potential is applied, and a positive input terminal 3. The operational amplifier 1 is a programmable amplifier having a programming input 4 to which a programming current is applied to turn the amplifier "ON".

Speech signals to be processed and which are fed from a telephone handset arrive at an input terminal 5 which constitutes the further input terminal and are fed via a capacitor 6 to the input terminal 3 of the operational amplifier 1, the capacitor 6 being connected between the terminal 5 and the terminal 3.

The amplifier 1 is provided with both current and voltage negative feedback. The current negative feedback is provided by a NPN transistor 7 whose base electrode 8 is fed from the amplifier 1 and whose emitter electrode 9 is coupled via a resistor 10 to a reference potential 11. The transistor 7 has a collector electrode 12 which is connected directly to the input terminal 3 of the amplifier 1.

The voltage negative feedback is provided by a transistor 13 which has a base electrode 14 fed from the amplifier 1, an emitter electrode 15 coupled via a resistor 16 to the reference potential 11 and a collector electrode 17 which is coupled via a resistor 18 to the terminal 5 and is therefore coupled to the opposite side of the capacitor 6 to that which is connected to the terminal 3 of the amplifier 1. The collector electrode 17 of the transistor 13 is also connected to an output terminal 19 which provides an output terminal of the speech circuit and which is coupled to a subscriber line via a diode bridge circuit (not shown).

D.C. bias settings for the input terminal 3 of the amplifier 1 are provided by means of resistors 20 and 21 which are connected in series between the input terminal 3 of the amplifier 1 and a reference potential 22, the reference potentials 11 and 22 being provided by a supply voltage 23 connected therebetween.

As mentioned previously the amplifier 1 is turned on by means of a programming current applied to its programming input 4. This programming current is supplied from an output 24 of a current mirror circuit 25 supplied with an operating potential from the reference potential 22 and with an input current fed to its input 26 via a resistor 27 from an output 28 of a comparator circuit 29 which is connected between the reference potentials 22 and 11. The comparator 29 has a reference input 30 which is supplied with a reference potential and an input 31 which is connected to a point 32 between the resistors 20 and 21.

In order to control current drawn by the circuit an NPN current mirror 33 receives an input current at its input terminal 34 and substracts an output current via an output terminal 35 from the input terminal 3 of the amplifier 1. The same output current is fed via an output terminal 36 of the current mirror 33 to an input terminal 37 of a PNP current mirror 38 whose output terminal 39 is connected to supply an equal current to the input terminal 5 which is connected to the opposite side of the capacitor 6 to that connected to the terminal 3 of the amplifier 1.

Different aspects of the operation of the speech circuit will now be considered from which it will be seen that the capacitor 6 performs a different function in each aspect of the operation, thereby allowing a saving in the number of capacitors used in the circuit and a saving in terminal pins on the integrated circuit package in which the circuit will be mounted after fabricated in integrated circuit form.

In its simplest mode of operation the amplifier 1 amplifies speech signals fed from a telephone handset to the input terminal 5. Amplified speech signals are fed to the output terminal 19 of the circuit. The speech signals to be amplified are of course A.C. signals and the terminal 5 is coupled to the input terminal 3 of the amplifier via the capacitor 6 which acts as a coupling capacitor for the A.C. signals whilst blocking the passage of D.C. current so that the quiensent D.C. level of output current at the terminal 19 is independent of the value of D.C. current flowing at the input terminal 5.

A second aspect of operation will now be considered. Until a subscriber removes his handset from the hook the reference potentials 22 and 11 supplied by the the battery 23 are disconnected and all internal currents are "OFF". The operational amplifier 1 is not supplied with a programming current at its programming input 4 and is also turned "OFF". At the moment a subscriber removes his handset off the hook a delay typically of 200 m. seconds must be provided before the circuit becomes fully operational to amplify speech signals. This time is required to enable a central station to recognise the "OFF" hook condition.

Assume that at the moment the handset is removed, current at terminal 5 is zero as also is current applied to the terminal 34. The supply voltage 23 will now be connected to apply the reference potentials 22 and 11 and the capacitor 6 will commence to charge via the resistors 20 and 21. As the capacitor charges the potential at the point 32 at the junction of the resistors 20 and 21 will increase and this potential is applied to the input 31 of the comparator 29 whose input terminal 30 receives a reference potential at the same time as the supply voltage 23 is connected. The potential $V_{32}$ at the junction point 32 between the resistors 20 and 21 is given by $$V_{32} = V_{cc}\left[1 - \frac{R_{18}}{R_{18} + R_{40}} \frac{R_{21}}{R_{20} + R_{21} + \frac{R_{18}R_{40}}{R_{18} + R_{40}}} \exp\left(-\frac{t}{\tau}\right)\right]$$

where $\tau$ is given by $$\tau = C_{10}\left(R_{20} + R_{21} + \frac{R_{18}R_{40}}{R_{18}R_{40}}\right)$$

$V_{cc}$ is the voltage of the battery 23, and $R_{18}$, $R_{20}$, $R_{21}$ and $R_{40}$ are the values of the resistors identified by the corresponding reference numerals in the drawing.

When the potential at the point 32 reaches the value of the reference potential applied to the terminal 30 of the comparator 29 the comparator switches "ON" to provide an output current at its output terminal 28 which is fed as an input current to the input terminal 26 of the current mirror circuit 25 and then as a programming current via the output terminal 24 of the current mirror 25 to the programming input 4 of the operational amplifier 1. The operational amplifier 1 turns "ON" and the circuit is then able to amplify input signals fed to the input terminal 5 in the normal way. The capacitor 6 therefore acts to provide a timing function to allow a delay between the application of the battery potential and the switching on of the operational amplifier 1.

As explained above the speech circuit, part of which is illustrated in the drawings is normally connected to a subscriber line via a diode bridge (not shown). The diode bridge is coupled to the terminal 19 and the signals appearing at this terminal are A.C. signals superimposed on a D.C. level. The speech circuit acts to regulate current drawn from the line in dependence upon whether the line is long or short. Signals supplied by the diode bridge are compared with a reference level and a control current is obtained which acts to control the current drawn from the line by the speech circuit. For a long line the circuit draws only a small current which is equal to the maximum current available from the line while maintaining only a relatively small voltage drop across itself. In the case of a short line the current drawn is limited only by the circuit itself.

The control current for controlling current drawn by the speech circuit is the current $I_c$ which is fed to the input terminal 34 of the current mirror circuit 33. This current is steered by the current mirror circuit so that at its output terminal 35 a current flows in such a direction as to be subtracted from the input terminal 3 of the operational amplifier 1 to which the output terminal 35 is connected.

The circuit will firstly be considered on the assumption that the controlling current $I_c$ is zero, this being the case for short lines. The current negative feedback provided by the transistor 7 to the input terminal 3 of the operational amplifier acts to bring the potential at that input terminal equal to the value of the reference potential $V_{R1}$ at the input terminal 2.

The supply voltage $V_{cc}$ is known and therefore so is the potential drop across the combined value of $R_{25}$ of the resistors 20 and 21. The current flowing through the resistors 20 and 21 can therefore be calculated and is given by $$I_{20} = \frac{V_{cc} - V_{R1}}{R_{25}}$$

Since the current $I_c$ is zero and therefore no current is flowing at the output terminal 35 of the current mirror circuit 33 the current $I_{20}$ can only flow through the transistor 7 and the resistor 10. The potential drop across the resistor 10 is therefore given by $V_{10} = I_{20} R_{10}$ where $R_{10}$ is the resistance of the resistor 10.

The potential drop across the resistor 16 whose value is given by $R_{16}$ will be almost the same as that across the resistor 10, and will be given by $$V_{16} = \frac{V_{cc} - V_{R1}}{R_{20}} R_{10}$$

the current flowing through the resistor 16 is equal to the current $I_L$ drawn by the circuit at the terminal 19 and as can be seen this value does not depend on the voltage $V_L$ at the terminal 19 but only on the potential $V_{16}$ appearing across the resistor 16.

For longer lines the comparison of the voltage appearing at the output of the diode bridge, with a reference potential will result in a correction current $I_c$ appearing at the input terminal 34 of the current mirror circuit 33. The current $I_{20}$ remains the same as before and also the potential at the input terminal 3 of the operational amplifier 1 will still equal the reference potential $V_{R1}$ due to the negative feedback. However, a current $I_c$ will now be flowing at the output terminal 35 of the current mirror circuit 33 and this value of current will therefore be sunk to ground from the input terminal 3 of the amplifier 1. The current I flowing through the transistor 7 will now be equal to $I_{20}-I_c$. This will produce a lower value of current through the resistor 16 and hence a lower value of current $I_L$.

The above calculations concerning the output current $I_L$ relate to D.C. current and voltages. In view of the way in which the current $I_c$ is derived this current can have an A.C. component $i_c$. This A.C. component will also flow in the current feedback loop of the amplifier 1 through the transistor 7. The flow of A.C. current in the negative feedback circuit of the amplifier 1 has undesirable effects including changing the output impedance, usually 600 ohms presented at the terminal 19 by the circuit. In order to compensate for the effects of this A.C. component the current $I_c$ is steered by means of the current mirror circuit 38 to the further input terminal 5. The current flowing at the output 36 of the current mirror 33 is coupled to the input terminal 37 of the current mirror circuit 38 and flows at the output terminal 39 of that circuit and to the terminal 5.

The capacitor 6 has an impedance which decreases with frequency and therefore is a short circuit at high frequencies. The high frequency components $i_c$ therefore flow through the capacitor and these A.C. components are essentially equal and opposite in direction of flow to the A.C. components in the current withdrawn from the terminal 3 of the amplifier 1 and flowing through the output terminal 35 of the current mirror circuit 33. The overall effect is to reduce substantially A.C. components in the current I flowing in the current feedback 30 of the amplifier 1 via the transistor 7. The capacitor 6 therefore in essence acts as a low pass filter for the control current $I_c$.

As seen previously the D.C. current I flowing through the current feedback path of the amplifier 1 and through the transistor 7 is dependent only upon the value of the resistance $R_{25}$, on $V_{cc}$, $V_{R1}$ and upon $I_c$ and since this current does not depend on $V_L$, changing the value of $V_L$ therefore will produce no effect on the above mentioned currents and voltages.

In response to an a.c. component $v_L$ across the resistor 18, the a.c. current $i_{18}$ through that resistor is given by $$i_{18} = \frac{v_L}{R_{18}}$$

All A.C. current through the resistor 18 also flows through the feedback loop of the amplifier 1 and through the resistor 10 and the potential across that resistor is given by $i_{18} \times R_{10}$.

As seen before the potential across the resistor 16 is approximately the same as that across the resistor 10 and therefore the current through this resistor is given by $$i_{16} = \frac{i_{18} \times R_{10}}{R_{16}} = \frac{v_L R_{10}}{R_{18} \times R_{16}}$$

$$i_L = i_{18} + i_{16} = i_{18} + i_{18} \frac{R_{10}}{R_{16}}$$

$$i_L = i_{18}\left(1 + \frac{R_{10}}{R_{16}}\right) = \frac{v_L}{R_{18}}\left(1 + \frac{R_{10}}{R_{16}}\right)$$

Therefore the A.C. output impedance $$Z_L = \frac{v_L}{i_L} = \frac{R_{18}}{1 + \frac{R_{10}}{R_{16}}}$$

This output impedance can therefore be seen to depend only upon the value of three resistors and not on the values of any voltages or currents present in the circuit.

The output impedance for A.C. characteristics can therefore be chosen to by any desired value, being typically 600 ohms for telephone speech circuits and can be made different to the D.C. output impedance which would be very much larger. This is made possible by the provision of the capacitor 6 which provides impedance decoupling between the A.C. and D.C. output characteristics.

As can be seen therefore the circuit described with reference to the drawing contains only one capacitor 10 and yet this capacitor performs four distinct functions and therefore enables a saving both on capacitors and on the number of output terminals which need to be provided in the integrated circuit package. For example the package terminals may be reduced from 40 to 28.

The invention has been described by way of example and modifications may be made without departing from the scope of the invention. For example, the invention has been particularly described with reference to part of a telephone speech circuit but the invention has other applications. The amplifier 1 may be a non-programmable amplifier and the current mirror circuit 25 and the comparator circuit 29 may therefore be omitted. In a simplified embodiment the separate current and voltage negative feedback utilized in the described embodiment could be replaced by a single feedback path between output and input of the operational amplifier 1 via a resistor. However under these circumstances the number of separate functions performed by the capacitor would be reduced although the capacitor would still retain at least two functions therefore allowing some important savings to be made.

What is claimed is:

1. A signal processing arrangement comprising:
   an operational amplifier having a first input terminal for receiving a reference potential, a second input terminal, and an output terminal;
   negative feedback means coupled between the output terminal of the amplifier and the second input terminal;
   a further input terminal for receiving signals to be processed;
   capacitive means coupled between the further input terminal and the second input terminal of the amplifier; and
   means for coupling a predetermined control current to the second input terminal of the amplifier and as an equal and opposite current to the further input terminal;
   whereby an output current of the signal processing arrangement derived from the output terminal of the operational amplifier is regulated in accordance with the predetermined control current, and the effects of unwanted A.C. components in the predetermined control current reduced.

2. The signal processing arrangement as claimed in claim 1, wherein the means for coupling the predetermined current comprises a current steering circuit arrangement.

3. The signal processing arrangement as claimed in claim 2, wherein the current steering circuit arrangement is a current mirror circuit.

4. The signal processing arrangement as claimed in claim 1 wherein the negative feedback means includes current feedback means.

5. The signal processing arrangement as claimed in claim 2 wherein the negative feedback means includes current feedback means.

6. The signal processing arrangement as claimed in claim 3 wherein the negative feedback means includes current feedback means.

7. The signal processing arrangement as claimed in claim 4, wherein the current feedback means comprises a transistor having a base electrode coupled to the output terminal of the amplifier, an emitter electrode coupled to a reference potential and a collector electrode coupled to the second input terminal of the amplifier.

8. The signal processing arrangement as claimed in claim 5, wherein the current feedback means comprises a transistor having a base electrode coupled to the output terminal of the amplifier, an emitter electrode coupled to a reference potential and a collector electrode coupled to the second input terminal of the amplifier.

9. The signal processing arrangement as claimed in claim 6, wherein the current feedback means comprises a transistor having a base electrode coupled to the output terminal of the amplifier, an emitter electrode coupled to a reference potential and a collector electrode coupled to the second input terminal of the amplifier.

10. The signal processing arrangement as claimed in claim 1 wherein the negative feedback means includes voltage feedback means.

11. The signal processing arrangement as claimed in claim 2, wherein the negative feedback means includes voltage feedback means.

12. The signal processing arrangement as claimed in claim 3, wherein the negative feedback means includes voltage feedback means.

13. The signal processing arrangement as claimed in claim 10, wherein the voltage feedback means comprises a transistor having a base electrode coupled to the output terminal of the amplifier, an emitter electrode coupled to a reference potential and a collector electrode connected by resistive means to the further input terminal.

14. The signal processing arrangement as claimed in claim 11, wherein the voltage feedback means comprises a transistor having a base electrode coupled to the output terminal of the amplifier, an emitter electrode coupled to a reference potential and a collector electrode connected by resistive means to the further input terminal.

15. The signal processing arrangement as claimed in claim 12, wherein the voltage feedback means comprises a transistor having a base electrode coupled to the output terminal of the amplifier, an emitter electrode coupled to a reference potential and a collector electrode connected by resistive means to the further input terminal.

16. The signal processing arrangement as claimed in claim 1 wherein the operational amplifier is a programmable operational amplifier which may be turned on in response to a programming current fed to a programming input of the amplifier.

17. The signal processing arrangement as claimed in claim 7 wherein the operational amplifier is a programmable operational amplifier which may be turned on in response to a programming current fed to a programming input of the amplifier.

18. The signal processing arrangement as claimed in claim 8 wherein the operational amplifier is a programmable operational amplifier which may be turned on in response to a programming current fed to a programming input of the amplifier.

19. The signal processing arrangement as claimed in claim 9 wherein the operational amplifier is a porgammable operational amplifier which may be turned on in response to a programming current fed to a programming input of the amplifier.

20. The signal processing arrangement as claimed in claim 16, wherein the programming current is derived from the output of a comparator arranged to compare a potential representative of the state of charge of the said capacitive means with a reference potential.

21. The signal processing arrangement as claimed in claim 1 and forming part of a telephone speech circuit.

22. The signal processing arrangement as claimed in claim 1 and fabricated as an integrated circuit.

* * * * *